(12) United States Patent
Bertness et al.

(10) Patent No.: US 6,597,150 B1
(45) Date of Patent: Jul. 22, 2003

(54) METHOD OF DISTRIBUTING JUMP-START BOOSTER PACKS

(75) Inventors: Kevin I. Bertness, Batavia, IL (US); Ronald J. Ortiz, Bolingbrook, IL (US)

(73) Assignee: Midtronics, Inc., Willowbrook, IL (US)

( * ) Notice: Subject to any disclaimer, the term of this patent is extended or adjusted under 35 U.S.C. 154(b) by 0 days.

(21) Appl. No.: 10/128,790

(22) Filed: Apr. 22, 2002

Related U.S. Application Data

(60) Provisional application No. 60/300,386, filed on Jun. 22, 2001.

(51) Int. Cl.[7] .................................................. H02J 7/00
(52) U.S. Cl. ........................................ 320/104; 320/105
(58) Field of Search ................................ 320/104, 105, 320/103, 107; 307/66

(56) References Cited

U.S. PATENT DOCUMENTS

| | | | |
|---|---|---|---|
| 3,652,341 A | * | 3/1972 | Halshall et al. .............. 429/118 |
| 5,982,138 A | * | 11/1999 | Krieger ....................... 320/105 |

* cited by examiner

*Primary Examiner*—Edward H. Tso
*Assistant Examiner*—Lawrence Luk
(74) *Attorney, Agent, or Firm*—Westman, Champlin & Kelly

(57) ABSTRACT

A method of distributing jump-start booster packs. The method includes furnishing a jump-start booster pack without an internal booster battery at an origin location and packaging the jump-start booster pack at the origin location. The jump-start booster pack is then shipped to a remote location.

14 Claims, 5 Drawing Sheets

METHOD OF DISTRIBUTING JUMP-START BOOSTER PACKS

CROSS REFERENCE TO RELATED APPLICATION

This application claims priority of U.S. Provisional Application No. 60/300,386, filed Jun. 22, 2001 and entitled "BATTERY CHARGER WITH BOOSTER PACK".

This application is related to pending U.S. patent application Ser. No. 10/112,114, filed Mar. 28, 2002 and entitled "BOOSTER PACK WITH STORAGE CAPACITOR" and to pending U.S. application Ser. No. 10/109,734 filed Mar. 28, 2002 and entitled "APPARATUS AND METHOD FOR COUNTERACTING SELF DISCHARGE IN A STORAGE BATTERY", both of which are herein incorporated by reference.

BACKGROUND OF THE INVENTION

The present invention relates to jump-start booster pack assemblies intended for use to provide additional energy to vehicle batteries to provide sufficient cranking energy to start the vehicle.

There is a relatively high requirement for the provision of jump-start booster packs to the market, where the jump-start booster packs are intended only to provide a "topping up" for a vehicle battery that has been discharged to such an extent that the vehicle battery is incapable of delivering sufficient energy so as to provide cranking and thereby starting of the vehicle. Such conditions normally arise due to the fact that the operator of the vehicle has inadvertently left the lights, radio, or other energy consuming device or accessory running in the vehicle after the vehicle ignition has been turned off. Such a depleted or "dead" battery is incapable of providing the necessary cranking power to start the vehicle. A jump-start booster pack, used to provide cranking energy to start the vehicle under these conditions, includes an internal booster battery of about the same terminal voltage as the vehicle battery. Such an internal booster battery is usually relatively heavy and forms a substantial portion of the weight of the jump-start booster pack. Jump-start booster packs are assembled, with internal batteries included, at an origin location, such as a manufacturing plant. These assembled booster packs containing internal booster batteries are then shipped to remote locations, such as automobile parts retail stores. Shipping jump-start booster packs that contain relatively heavy internal booster batteries adds to the shipping costs. Also, the jump-start booster packs can be relatively expensive since they contain both a booster battery and supporting hardware and circuitry. A method of distributing jump-start booster packs which address one or more of these problems would be an improvement in the art.

SUMMARY OF THE INVENTION

The present invention provides a method for distributing jump-start booster packs. The method includes furnishing a jump-start booster pack without an internal booster battery at an origin location and packaging the jump-start booster pack at the origin location. The jump-start booster pack is then shipped to a remote location.

BRIEF DESCRIPTION OF THE DRAWINGS

FIG. 3-1 is a very simplified block diagram of a jump-start booster pack including integrated battery charging and testing circuitry.

FIG. 3-2 is a simplified block diagram showing components of charging and testing circuitry of the jump-start booster pack of FIG. 1.

DETAILED DESCRIPTION OF THE PREFERRED EMBODIMENTS

Figure 1:
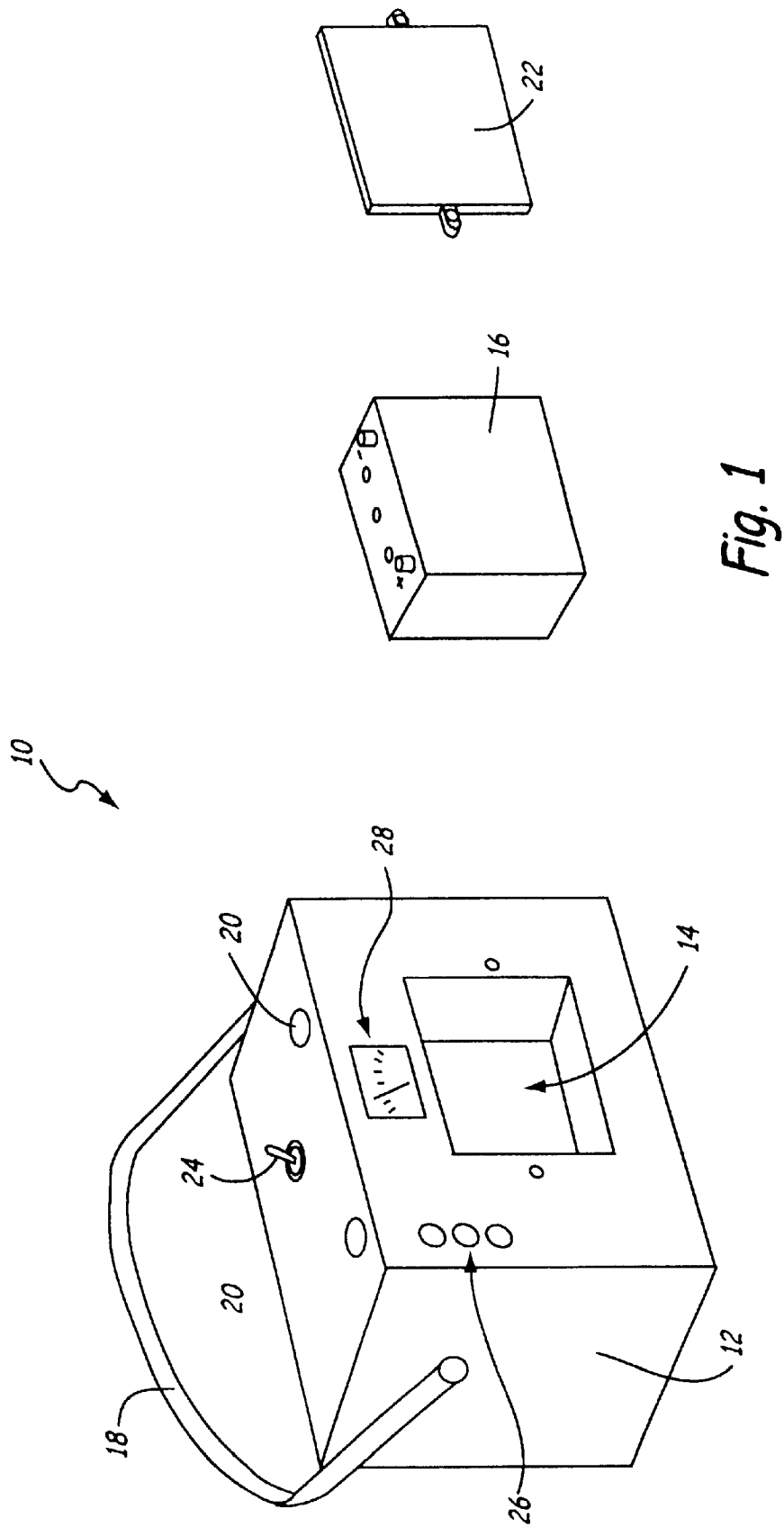
FIG. 1 illustrates an exploded view of a jump-start booster pack assembly with which the present invention can be carried out.

FIG. 1 illustrates an exploded view of a jump-start booster pack assembly with which the present invention can be carried out. Jump-start booster pack assembly 10 includes a housing 12 with a battery cavity 14 that can receive battery 16. A handle 18 is included for conveniently carrying assembly 10. Polarized plugs 20 are included for easy connection of cables (not shown in FIG. 1), which are employed to electrically couple booster pack 10 to a vehicle battery (not shown in FIG. 1). Lid 22, which may be any type of easily removable lid, is provided to hold battery 16 in place within battery cavity 14. Also included is an activation switch 24 and LED(s) 26, which are described further below in connection with FIG. 2. A current and/or voltage gauge or meter 28 can optionally be included to provide current and/or voltage readings during operation of jump-start booster pack assembly 10.

In aspects of the present invention, jump-start booster packs 10, are assembled without internal batteries 16, at an origin location, such as a manufacturing plant. These assembled booster packs 10 without internal booster batteries 16 are then shipped to remote locations, such as automobile parts retail stores. Shipping such jump-start booster packs 10 without the relatively heavy internal booster batteries 16 significantly reduces shipping costs. Also, batteries 16 that can be installed in jump-start booster packs 10 are usually available at retail stores that sell such booster packs. Thus, shipping jump-start booster packs with internal booster batteries to such retail stores is unnecessary. Further, due to the absence of the internal booster batteries, the cost of a shipment of booster packs 10 is relatively reduced.

Lead acid storage batteries are typically employed as booster batteries 16. When a lead acid battery is left idle for a substantial period of time without being recharged, a build-up of sulfur molecules on the battery plates takes place due to self-discharge of the battery. This formation of sulfur on the battery plates is called sulfation. Sulfation hardens the battery plates, reducing and eventually destroying the ability of the battery to generate charge. In lead acid batteries employing thin film positive and negative plates, relatively rapid hardening of the plates due to sulfation occurs because the plates are ultra-thin films. Such thin film lead acid batteries are commonly employed as booster batteries 16. By excluding internal booster batteries 16 form booster packs 10 during distribution and storage, "fresh" booster batteries 16 can be installed in booster packs 10 just prior to their sale.

Figure 2:
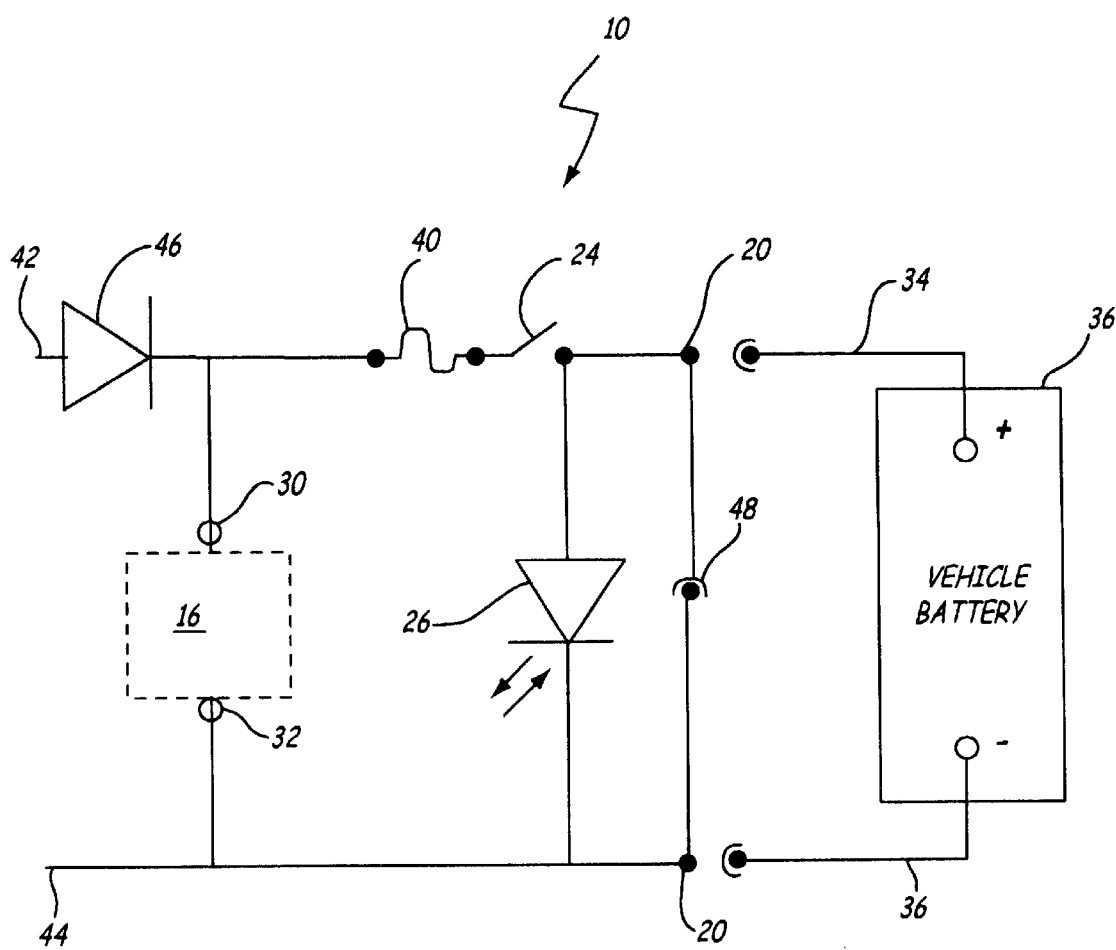
FIG. 2 is a simplified block diagram of a jump-start booster pack including a replaceable booster battery with which the present invention can be carried out.

FIG. 2 is a simplified block diagram showing circuitry included in jump-start booster pack 10. As mentioned above, booster battery 16 is installed subsequent to manufacture/assembly of booster pack 10. Electrical connectors 30 and 32 electrically couple booster battery 16 to the booster pack circuitry when booster battery 16 is secured within battery cavity 14 (FIG. 1). Positive and negative connectors or cables 34 and 36 are schematically indicated, and are provided to connect booster battery 16 to terminals of vehicle battery 38. Switch 24, included in series with cable 34 (only one switch connected to either cable 34 or 36 is required) provides a connection between booster battery 16 and vehicle battery 38, after the cables 34 and 36 have been put in place. A fuse 40 is provided in series with the switch 24. Alternatively, fuse 40 and switch 24 could be provided as a single entity, such as a circuit breaker switch. There is also provided protection against inadvertent wrong polarity connections being made.

A lamp 26, such as a LED, may be provided across the terminals of booster battery 16 at a position on a side of switch 24 which is remote from booster battery 16. Therefore, when booster battery 16 is connected to vehicle battery 38, and the switch 24 is closed, lamp 26 will be illuminated. Lamp 26 may be Zener operated in such a manner that it will only illuminate when it is connected across the voltage of the booster battery 16, but not across a substantially depleted terminal voltage of the vehicle battery 38.

In some embodiments of the present invention, internal booster battery 16 may be charged by vehicle battery 38 or a vehicle alternator system (not shown) by electrically coupling to input nodes 42 and 44 of jump-start booster pack 10. A diode 46, may be included to prevent backflow of energy from internal booster battery 16 when it is being charged. Connecting booster battery 16 to the vehicle battery 38 may simply involve plugging wires which are also permanently connected to booster battery 16 and to a cigarette lighter plug into a cigarette lighter socket.

In some embodiments of the present invention, apparatus 10 can function as a portable power pack. In such embodiments, a connection or socket means, shown schematically at 48, which is essentially identical to a cigarette lighter socket may be connected across booster battery 16. Battery or low voltage operated devices such as emergency lamps, search lamps, a vacuum cleaner, etc., may be powered for a short term from the booster battery 16 by being connected from their own plug to the cigarette lighter socket arrangement 48.

To operate jump-start booster pack 10 to provide sufficient starting energy to vehicle battery 38, the appropriate connections are made as discussed above. One end of each cable is connected to the terminals of the vehicle battery 38 and the other end of each cable is connected to each plug 20 in jump-start booster pack 10. Then, after the cables are connected to the vehicle battery 38 and to the booster pack 10, the switch 24 is closed and energy will flow from the booster battery 16 to the vehicle battery 38. After connection of booster battery 16 to the vehicle battery 38, the voltage of the parallel connected vehicle battery and booster battery rises to a level which is necessary to initiate and sustain spark ignition during cranking.

Jump-start booster pack 10 described above is only illustrative in nature and those skilled in the art will appreciate that the present invention may be practiced with any type of jump-start booster pack in which the internal booster battery can be installed subsequent to manufacture/assembly of the booster pack.

Figures 1, 3:
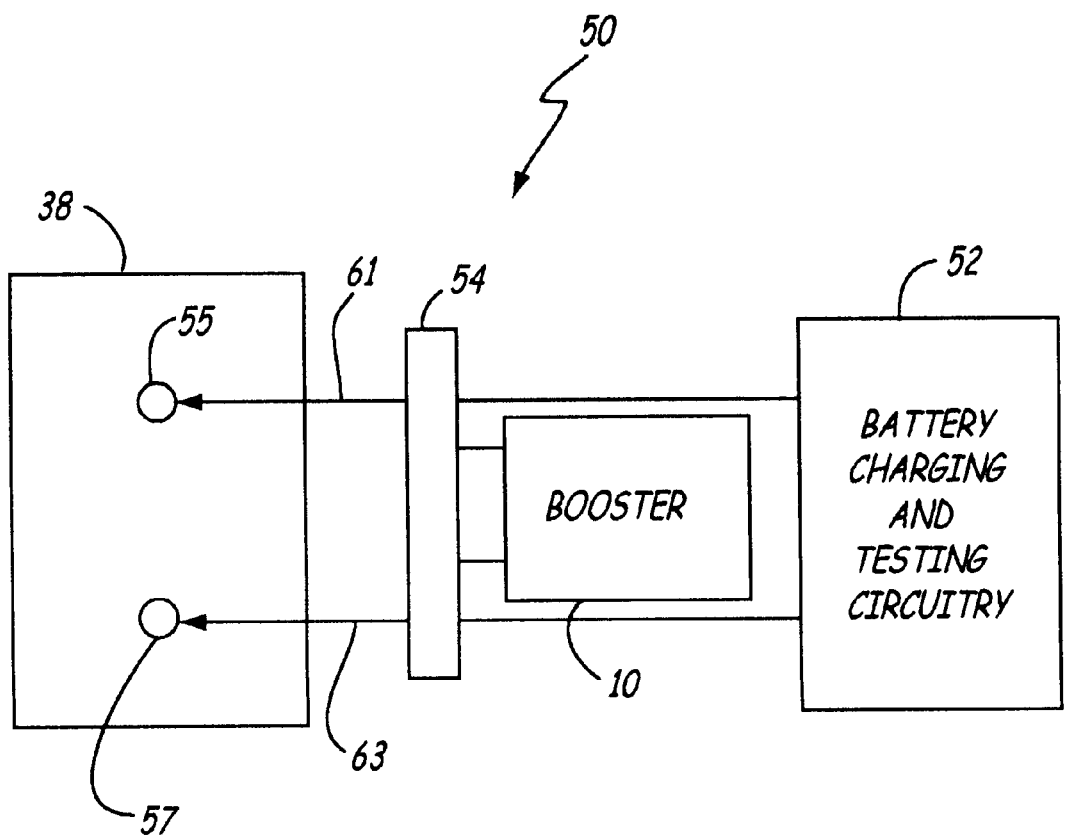
Figures 2, 3:
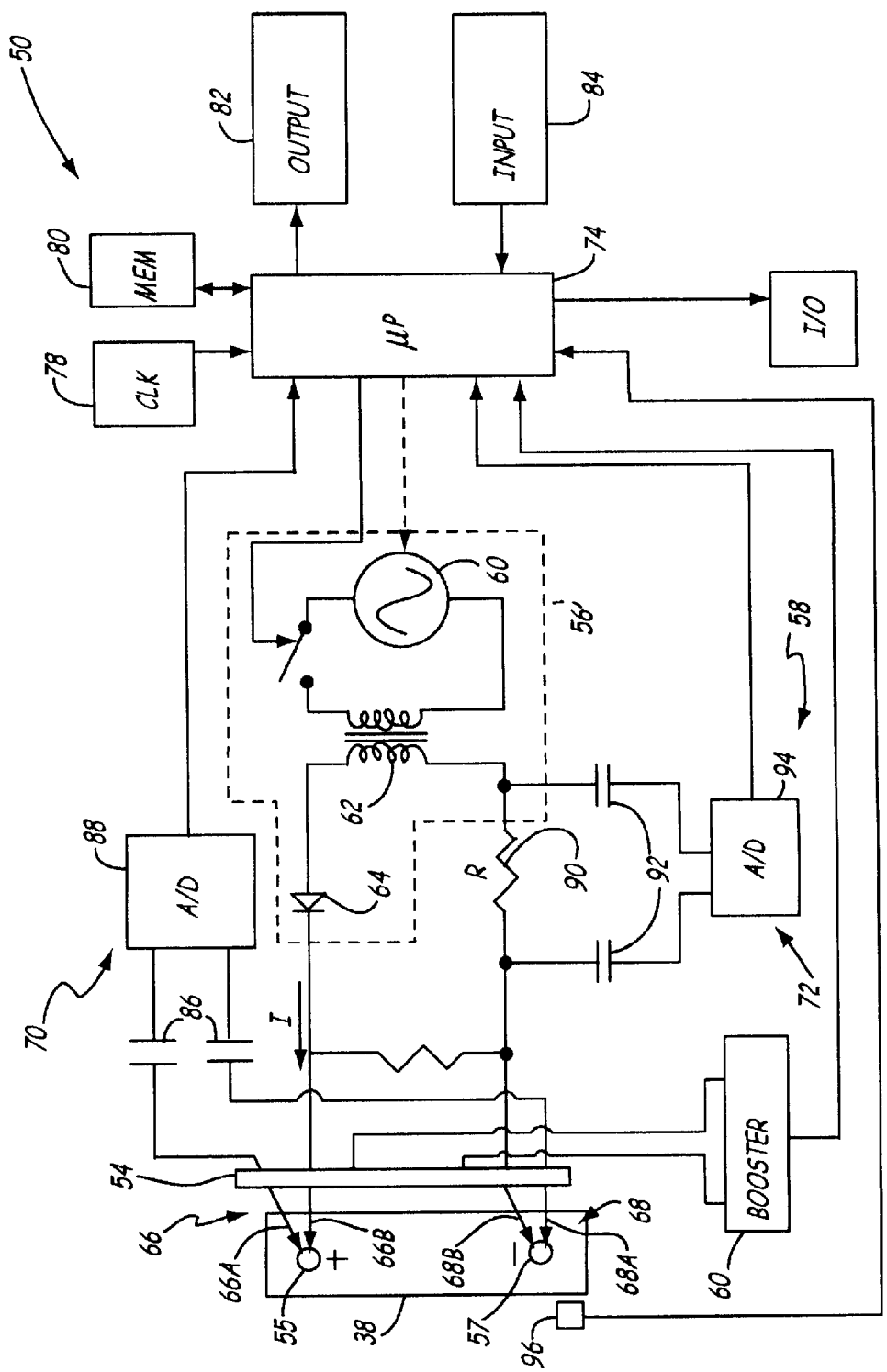

FIG. 3-1 is a very simplified block diagram of a jump-start booster pack with integrated battery charging and testing circuitry. System 50 is shown coupled to a vehicle battery 38. System 50 includes battery charging and testing circuitry 52, jump-start booster pack 10, described above in connection with FIGS. 1 and 2, and mode selection switch 54. System 50 couples to battery contacts 55 and 57 through electrical connections 61 and 63, respectively. Details and components of a battery charging and testing circuitry 52 are provided in the description of FIG. 3-2 below. Mode selection switch 54 can be set in different positions, with each position corresponding to a different mode in which system 50 operates. For example, system 50 can be set to operate in modes such as "charge vehicle battery", "charge booster battery", "charge vehicle battery and booster battery", "jump-start vehicle battery", "test vehicle battery", "test booster battery" etc.

FIG. 3-2 is a simplified block diagram of an embodiment of system 50 showing components of charging and testing circuitry 52. System 50 is shown coupled to vehicle battery 38. System 50 includes battery charger circuitry 56, battery test circuitry 58 and a jump-start booster pack 10. Battery charge circuitry 56 generally includes AC source 60, transformer 62 and rectifier 64. System 50 couples to vehicle battery 38 through electrical connection 66 which couples to the positive battery contact 55 and electrical connection 68 which couples to the negative battery contact 57. Mode selection switch 54 can be set in the different positions mentioned above in connection with FIG. 3-1. In one preferred embodiment, a four point (or Kelvin) connection technique is used in which battery charge circuitry 56 couples to battery 38 through electrical connections 66A and 68A while battery testing circuitry 58 couples to vehicle battery 38 through electrical connections 66B and 68B.

Battery testing circuitry 58 includes voltage measurement circuitry 70 and current measurement circuitry 72 which provide outputs to microprocessor 74. Microprocessor 74 also couples to a system clock 78 and memory 80 which is used to store information and programming instructions. In the embodiment of the invention shown in FIG. 3-2, microprocessor 74 also couples to booster pack 10, user output circuitry 82 and user input circuitry 84.

Voltage measurement circuitry 70 includes capacitors 86 which couple analog to digital converter 88 to vehicle battery 38 thorough electrical connections 66B and 68B. Any type of coupling mechanism may be used for element 86 and capacitors are merely shown as one preferred embodiment. Further, the device may also couple to DC signals. Current measurement circuitry 72 includes a shunt resistor (R) 90 and coupling capacitors 92. Shunt resistor 90 is coupled in series with battery charging circuitry 56. Other current measurement techniques are within the scope of the invention including Hall-Effect sensors, magnetic or inductive coupling, etc. An analog to digital converter 94 is connected across shunt resistor 90 by capacitors 92 such that the voltage provided to analog to digital converter 94 is proportional to a current I flowing through vehicle battery 38 due to charging circuitry 96. Analog to digital converter 94 provides a digitized output representative of this current to microprocessor 94.

During operation in vehicle battery charging mode, AC source 60 is coupled to vehicle battery 38 through transformer 62 and rectifier 64. Rectifier 64 provides half wave rectification such that current I has a non-zero DC value. Of course, full wave rectification or other AC sources may also be used. Analog to digital converter 94 provides a digitized output to microprocessor 74 which is representative of current I flowing through vehicle battery 38. Similarly, analog to digital converter 88 provides a digitized output representative of the voltage across the positive and negative terminals of vehicle battery 38. Analog to digital converters 88 and 94 are capacitively coupled to vehicle battery 38 such that they measure the AC components of the charging signal.

Microprocessor 74 determines the conductance of vehicle battery 38 based upon the digitized current and voltage information provided by analog to digital converters 94 and 88, respectively. Microprocessor 74 calculates the conductance of vehicle battery 14 as follows:

$$\text{Conductance} = G = I/V \qquad \text{Eq. 1}$$

where I is the AC charging current and V is the AC charging voltage across vehicle battery 38. The battery conductance is used to monitor charging of vehicle battery 38. It has been discovered that as a battery is charged the conductance of the battery rises which can be used as feedback to the charger. This rise in conductance can be monitored in microprocessor 74 to determine when the battery has been fully charged. Conductance can be correlated to a condition of vehicle battery 38 which can be used as a basis for comparison of the battery against a battery rating, such as the Cold Cranking Amp (CCA) rating of the battery. A temperature sensor 76 can be thermally coupled to battery 38 and used to compensate battery measurements. Temperature readings can be stored in memory 80 for later retrieval.

In accordance with the present invention, the internal booster battery 16 of booster pack 10 can also be charged and tested by circuitry 52 via electrical connectors 30 and 32 (FIG. 2) in a manner similar to that described for charging and testing vehicle battery 38. Results of tests performed on vehicle battery 38 and booster battery 16 may be displayed on a suitable device (not shown) that can couple to microprocessor 74.

Figure 4:
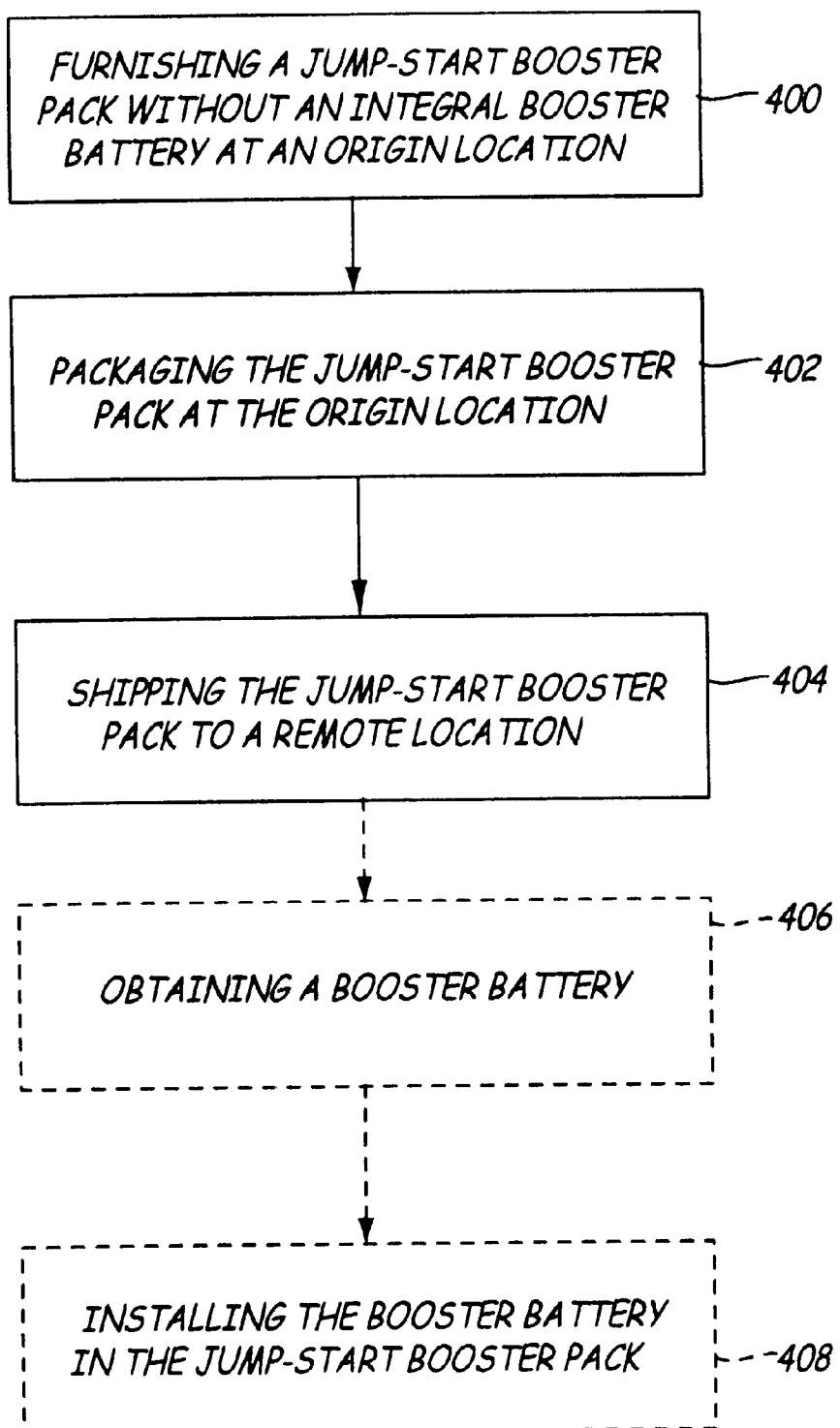
FIG. 4 is a flow chart representing a method of distributing jump-start booster packs in accordance with an illustrative embodiment of the present invention.

FIG. 4 is a flow chart representing a method of distributing jump-start booster packs in accordance with a specific illustrative embodiment of the present invention. At step 400, a jump-start booster pack without an internal booster battery is furnished at an origin location. At step 402, the jump-start booster pack is packaged at the origin location. At step 404, the jump-start booster pack is shipped to a remote location. At optional step 406, a booster battery is obtained for the jump-start booster pack. At optional step 408, the booster battery is installed in the jump-start booster pack.

In some embodiments, the origin location is a booster pack manufacturing plant. In embodiments of the present invention, the remote location is an automotive parts retail store. In some embodiments, the remote location is a wholesale distribution center. The booster battery is typically installed in the jump-start booster pack at the remote location.

In some embodiments, the jump-start booster pack is stored at a storage location. In embodiments of the present invention, the storage location is at the origin location. In some embodiments, the storage location is at a wholesale distribution center.

Although the present invention has been described with reference to preferred embodiments, workers skilled in the art will recognize that changes may be made in form and detail without departing from the spirit and scope of the invention.

Patents related to batteries and electrical system testing are shown and described in U.S. Pat. No. 3,873,911, issued Mar. 25, 1975, to Champlin, entitled ELECTRONIC BATTERY A TESTING DEVICE; U.S. Pat. No. 3,909,708, issued Sep. 30, 1975, to Champlin, entitled ELECTRONIC BATTERY TESTING DEVICE; U.S. Pat. No. 4,816,768, issued Mar. 28, 1989, to Champlin, entitled ELECTRONIC BATTERY TESTING DEVICE; U.S. Pat. No. 4,825,170, issued Apr. 25, 1989, to Champlin, entitled ELECTRONIC BATTERY TESTING DEVICE WITH AUTOMATIC VOLTAGE SCALING; U.S. Pat. No. 4,881,038, issued Nov. 14, 1989, to Champlin, entitled ELECTRONIC BATTERY TESTING DEVICE WITH AUTOMATIC VOLTAGE SCALING TO DETERMINE DYNAMIC CONDUCTANCE; U.S. Pat. No. 4,912,416, issued Mar. 27, 1990, to Champlin, entitled ELECTRONIC BATTERY TESTING DEVICE WITH STATE-OF-CHARGE COMPENSATION; U.S. Pat. No. 5,140,269, issued Aug. 18, 1992, to Champlin, entitled ELECTRONIC TESTER FOR ASSESSING BATTERY/CELL CAPACITY; U.S. Pat. No. 5,343,380, issued Aug. 30, 1994, entitled METHOD AND APPARATUS FOR SUPPRESSING TIME VARYING SIGNALS IN BATTERIES UNDERGOING CHARGING OR DISCHARGING; U.S. Pat. No. 5,572,136, issued Nov. 5, 1996, entitled ELECTRONIC BATTERY TESTER WITH AUTOMATIC COMPENSATION FOR LOW STATE-OF-CHARGE; U.S. Pat. No. 5,574,355, issued Nov. 12, 1996, entitled METHOD AND APPARATUS FOR DETECTION AND CONTROL OF THERMAL RUNAWAY IN A BATTERY UNDER CHARGE; U.S. Pat. No. 5,585,416, issued Dec. 10, 1996, entitled APPARATUS AND METHOD FOR STEP-CHARGING BATTERIES TO OPTIMIZE CHARGE ACCEPTANCE; U.S. Pat. No. 5,585,728, issued Dec. 17, 1996, entitled ELECTRONIC BATTERY TESTER WITH AUTOMATIC COMPENSATION FOR LOW STATE-OF-CHARGE; U.S. Pat. No. 5,589,757, issued Dec. 31, 1996, entitled APPARATUS AND METHOD FOR STEP-CHARGING BATTERIES TO OPTIMIZE CHARGE ACCEPTANCE; U.S. Pat. No. 5,592,093, issued Jan. 7, 1997, entitled ELECTRONIC BATTERY TESTING DEVICE LOOSE TERMINAL CONNECTION DETECTION VIA A COMPARISON CIRCUIT; U.S. Pat. No. 5,598,098, issued Jan. 28, 1997, entitled ELECTRONIC BATTERY TESTER WITH VERY HIGH NOISE IMMUNITY; U.S. Pat. No. 5,656,920, issued Aug. 12, 1997, entitled METHOD FOR OPTIMIZING THE CHARGING LEAD-ACID BATTERIES AND AN INTERACTIVE CHARGER; U.S. Pat. No. 5,757,192, issued May 26, 1998, entitled METHOD AND APPARATUS FOR DETECTING A BAD CELL IN A STORAGE BATTERY; U.S. Pat. No. 5,821,756, issued Oct. 13, 1998, entitled ELECTRONIC BATTERY TESTER WITH TAILORED COMPENSATION FOR LOW STATE-OF-CHARGE; U.S. Pat. No. 5,831,435, issued Nov. 3, 1998, entitled BATTERY TESTER FOR JIS STANDARD; U.S. Pat. No. 5,914,605, issued Jun. 22, 1999, entitled ELECTRONIC BATTERY TESTER; U.S. Pat. No. 5,945,829, issued Aug. 31, 1999, entitled MIDPOINT BATTERY MONITORING; U.S. Pat. No. 6,002,238, issued Dec. 14, 1999, entitled METHOD AND APPARATUS FOR MEASURING COMPLEX IMPEDANCE OF CELLS AND BATTERIES; U.S. Pat. No. 6,037,751, issued Mar. 14, 2000, entitled APPARATUS FOR CHARGING BATTERIES; U.S. Pat. No. 6,037,777, issued Mar. 14, 2000, entitled METHOD AND APPARATUS FOR DETERMINING BATTERY PROPERTIES FROM COMPLEX IMPEDANCE/ADMITTANCE; U.S. Pat. No. 6,051,976, issued Apr. 18, 2000, entitled METHOD AND APPARATUS FOR AUDITING A BATTERY TEST; U.S. Pat. No. 6,081,098, issued Jun. 27, 2000, entitled METHOD AND APPARATUS FOR CHARGING A BATTERY; U.S. Pat. No. 6,091,245, issued Jul. 18, 2000, entitled METHOD AND APPARATUS FOR AUDITING A BATTERY TEST; U.S. Pat. No. 6,104,167, issued Aug. 15, 2000, entitled METHOD AND APPARATUS FOR CHARGING A BATTERY; U.S. Pat. No. 6,137,269, issued Oct. 24, 2000, entitled METHOD AND APPARATUS FOR ELECTRONI- CALLY EVALUATING THE INTERNAL TEMPERATURE OF AN ELECTROCHEMICAL CELL OR BATTERY; U.S. Pat. No. 6,163,156, issued Dec. 19, 2000, entitled ELECTRICAL CONNECTION FOR ELECTRONIC BATTERY TESTER; U.S. Pat. No. 6,172,483, issued Jan. 9, 2001, entitled METHOD AND APPARATUS FOR MEASURING COMPLEX IMPEDANCE OF CELL AND BATTERIES; U.S. Pat. No. 6,172,505, issued Jan. 9, 2001, entitled ELECTRONIC BATTERY TESTER; U.S. Pat. No. 6,222,369, issued Apr. 24, 2001, entitled METHOD AND APPARATUS FOR DETERMINING BATTERY PROPERTIES FROM COMPLEX IMPEDANCE/ ADMITTANCE; U.S. Pat. No. 6,225,808, issued May 1, 2001, entitled TEST COUNTER FOR ELECTRONIC BATTERY TESTER; U.S. Pat. No. 6,249,124, issued Jun. 19, 2001, entitled ELECTRONIC BATTERY TESTER WITH INTERNAL BATTERY; U.S. Pat. No. 6,259,254, issued Jul. 10, 2001, entitled APPARATUS AND METHOD FOR CARRYING OUT DIAGNOSTIC TESTS ON BATTERIES AND FOR RAPIDLY CHARGING BATTERIES; U.S. Pat. No. 6,262,563, issued Jul. 17, 2001, entitled METHOD AND APPARATUS FOR MEASURING COMPLEX ADMITTANCE OF CELLS AND BATTERIES; U.S. Pat. No. 6,294,896, issued Sep. 25, 2001; entitled METHOD AND APPARATUS FOR MEASURING COMPLEX SELF-IMMITANCE OF A GENERAL ELECTRICAL ELEMENT; U.S. Pat. No. 6,294,897, issued Sep. 25, 2001, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,304,087, issued Oct. 16, 2001, entitled APPARATUS FOR CALIBRATING ELECTRONIC BATTERY TESTER; U.S. Pat. No. 6,310,481, issued Oct. 30, 2001, entitled ELECTRONIC BATTERY TESTER; U.S. Pat. No. 6,313,607, issued Nov. 6, 2001, entitled METHOD AND APPARATUS FOR EVALUATING STORED CHARGE IN AN ELECTROCHEMICAL CELL OR BATTERY; U.S. Pat. No. 6,313,608, issued Nov. 6, 2001, entitled METHOD AND APPARATUS FOR CHARGING A BATTERY; U.S. Pat. No. 6,316,914, issued Nov. 13, 2001, entitled TESTING PARALLEL STRINGS OF STORAGE BATTERIES; U.S. Pat. No. 6,323,650, issued Nov. 27, 2001, entitled ELECTRONIC BATTERY TESTER; U.S. Pat. No. 6,329,793, issued Dec. 11, 2001, entitled METHOD AND APPARATUS FOR CHARGING A BATTERY; U.S. Pat. No. 6,331,762, issued Dec. 18, 2001, entitled ENERGY MANAGEMENT SYSTEM FOR AUTOMOTIVE VEHICLE; U.S. Pat. No. 6,332,113, issued Dec. 18, 2001, entitled ELECTRONIC BATTERY TESTER; U.S. Pat. No. 6,351,102, issued Feb. 26, 2002, entitled AUTOMOTIVE BATTERY CHARGING SYSTEM TESTER; U.S. Pat. No. 6,359,441, issued Mar. 19, 2002, entitled ELECTRONIC BATTERY TESTER; U.S. Ser. No. 09/431,446, filed Nov. 1, 1999, entitled ALTERNATOR DIAGNOSTIC SYSTEM; U.S. Ser. No. 09/595, 102, filed Jun. 15, 2000, entitled APPARATUS AND METHOD FOR TESTING RECHARGEABLE ENERGY STORAGE BATTERIES; U.S. Ser. No. 09/703,270, filed Oct. 31, 2000, entitled ELECTRONIC BATTERY TESTER; U.S. Ser. No. 09/575,629, filed May 22, 2000, entitled VEHICLE ELECTRICAL SYSTEM TESTER WITH ENCODED OUTPUT; U.S. Ser. No. 09/780,146, filed Feb. 9, 2001, entitled STORAGE BATTERY WITH INTEGRAL BATTERY TESTER; U.S. Ser. No. 09/816,768, filed Mar. 23, 2001, entitled MODULAR BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ ADMITTANCE; U.S. Ser. No. 09/862,783, filed May 21, 2001, entitled METHOD AND APPARATUS FOR TESTING CELLS AND BATTERIES EMBEDDED IN SERIES/ PARALLEL SYSTEMS; U.S. Ser. No. 09/483,623, filed Jan. 13, 2000, entitled ALTERNATOR TESTER; U.S. Ser. No. 09/870,410, filed May 30, 2001, entitled INTEGRATED CONDUCTANCE AND LOAD TEST BASED ELECTRONIC BATTERY TESTER; U.S. Ser. No. 09/960,117, filed Sep. 20, 2001, entitled IN-VEHICLE BATTERY MONITOR; U.S. Ser. No. 09/908,389, filed Jul. 18, 2001, entitled BATTERY CLAMP WITH INTEGRATED CIRCUIT SENSOR; U.S. Ser. No. 09/908,278, filed Jul. 18, 2001, entitled BATTERY CLAMP WITH EMBEDDED ENVIRONMENT SENSOR; U.S. Ser. No. 09/880,473, filed Jun. 13, 2001; entitled BATTERY TEST MODULE; U.S. Ser. No. 09/876,564, filed Jun. 7, 2001, entitled ELECTRONIC BATTERY TESTER; U.S. Ser. No. 09/878,625, filed Jun. 11, 2001, entitled SUPPRESSING INTERFERENCE IN AC MEASUREMENTS OF CELLS, BATTERIES AND OTHER ELECTRICAL ELEMENTS; U.S. Ser. No. 09/902,492, filed Jul. 10, 2001, entitled APPARATUS AND METHOD FOR CARRYING OUT DIAGNOSTIC TESTS ON BATTERIES AND FOR RAPIDLY CHARGING BATTERIES; and U.S. Ser. No. 09/940,684, filed Aug. 27, 2001, entitled METHOD AND APPARATUS FOR EVALUATING STORED CHARGE IN AN ELECTROCHEMICAL CELL OR BATTERY; U.S. Ser. No. 09/977, 049, filed Oct. 12, 2001, entitled PROGRAMMABLE CURRENT EXCITER FOR MEASURING AC IMMITTANCE OF CELLS AND BATTERIES; U.S. Ser. No. 10/047,923, filed Oct. 23, 2001, entitled AUTOMOTIVE BATTERY CHARGING SYSTEM TESTER, U.S. Ser. No. 10/046,659, filed Oct. 29, 2001, entitled ENERGY MANAGEMENT SYSTEM FOR AUTOMOTIVE VEHICLE; U.S. Ser. No. 09/993,468, filed Nov. 14, 2001, entitled KELVIN CONNECTOR FOR A BATTERY POST; U.S. Ser. No. 09/992, 350, filed Nov. 26, 2001, entitled ELECTRONIC BATTERY TESTER, U.S. Ser. No. 10/042,451, filed Jan. 8, 2002, entitled BATTERY CHARGE CONTROL DEVICE; U.S. Ser. No. 10/042,451, filed Jan. 8, 2002, entitled BATTERY CHARGE CONTROL DEVICE, U.S. Ser. No. 10/073,378, filed Feb. 8, 2002, entitled METHOD AND APPARATUS USING A CIRCUIT MODEL TO EVALUATE CELL/ BATTERY PARAMETERS; U.S. Ser. No. 10/093,853, filed Mar. 7, 2002, entitled ELECTRONIC BATTERY TESTER WITH NETWORK COMMUNICATION; U.S. Ser. No. 60/364,656, filed Mar. 14, 2002, entitled ELECTRONIC BATTERY TESTER WITH LOW TEMPERATURE RATING DETERMINATION; U.S. Ser. No. 10/101,543, filed Mar. 19, 2002, entitled ELECTRONIC BATTERY TESTER; U.S. Ser. No. 10/112,114, filed Mar. 28, 2002; U.S. Ser. No. 10/109,734, filed Mar. 28, 2002; U.S. Ser. No. 10/112,105, filed Mar. 28, 2002 and U.S. Ser. No. 10/112, 998, filed Mar. 29, 2002, which are incorporated herein in their entirety.

What is claimed is:

1. A method of distributing jump-start booster packs, comprising:

furnishing a jump-start booster pack without an internal booster battery at an origin location, the jump-start booster pack comprising a housing having a battery cavity configured to receive a booster battery, the battery cavity further comprising electrical connectors configured to electrically couple to terminals of the booster battery;

packaging the jump-start booster pack at the origin location; and shipping the jump-start booster pack to a remote location.

2. The method of claim 1 wherein the origin location is a booster pack manufacturing plant.

3. The method of claim 1 wherein the remote location is an automotive parts retail store.

4. The method of claim 1 wherein the remote location is a wholesale distribution center.

5. The method of claim 4 wherein the storage location is at the origin location.

6. The method of claim 4 wherein the storage location is at a wholesale distribution center.

7. The method of claim 1 further comprising storing the jump-start booster pack at a storage location.

8. The method of claim 1 further comprising manufacturing the jump-start booster pack.

9. The method of claim 1 further comprising obtaining a booster battery for the jump-start booster pack.

10. The method of claim 9 further comprising installing the booster battery in the jump-start booster pack.

11. The method of claim 10 wherein installing the booster battery is carried out at the remote location.

12. The method of claim 1 wherein the jump-start booster pack comprises a lid configured to secure the booster battery within the battery cavity.

13. The method of claim 1 wherein the jump-start booster pack further comprises battery test circuitry configured to electrically couple to the terminals of the booster battery via the electrical connectors, and further configured to test the booster battery.

14. The method of claim 1 wherein the jump-start booster pack further comprises battery charging circuitry configured to electrically couple to the terminals of the booster battery via the electrical connectors, and further configured to charge the booster battery.

* * * * *